(12) United States Patent
Cordova (10) Patent No.: US 11,613,477 B2
(45) Date of Patent: Mar. 28, 2023

(54) SELF-CLEANING WATER FILTER

(71) Applicant: Faircap CIC, London (GB)

(72) Inventor: Mauricio Cordova, Barcelona (ES)

(73) Assignee: Faircap CIC, London (GB)

( * ) Notice: Subject to any disclaimer, the term of this patent is extended or adjusted under 35 U.S.C. 154(b) by 31 days.

(21) Appl. No.: 17/088,171

(22) Filed: Nov. 3, 2020

(65) Prior Publication Data

US 2022/0135432 A1     May 5, 2022

(51) Int. Cl.
    *C02F 1/00*      (2006.01)
    *B01D 29/00*      (2006.01)

(52) U.S. Cl.
CPC .......... *C02F 1/002* (2013.01); *B01D 29/0029* (2013.01); *B01D 29/0075* (2013.01); *B01D 2313/08* (2013.01); *B01D 2313/12* (2013.01); *B01D 2313/20* (2013.01); *B01D 2313/243* (2013.01); *B01D 2313/46* (2013.01); *B01D 2321/20* (2013.01); *C02F 2201/002* (2013.01)

(58) Field of Classification Search
CPC ............... C02F 1/002; C02F 2201/002; B01D 29/0029; B01D 29/0075; B01D 2313/08; B01D 2313/12; B01D 2313/20; B01D 2313/243; B01D 2313/46; B01D 2321/20
See application file for complete search history.

(56) References Cited

U.S. PATENT DOCUMENTS

| | | | |
|---|---|---|---|
| 2,796,850 A | 6/1957 | Mfred | |
| 3,567,632 A | 3/1971 | Richter | |
| 4,636,307 A | 1/1987 | Inoue et al. | |
| 4,879,032 A | 11/1989 | Zemlin | |
| 4,975,185 A * | 12/1990 | Taylor | B01D 61/18 210/321.89 |
| H1157 H | 4/1993 | Yanou et al. | |
| 5,225,079 A | 7/1993 | Saito et al. | |
| 5,433,848 A * | 7/1995 | Platter | F04B 53/123 210/416.3 |

(Continued)

FOREIGN PATENT DOCUMENTS

KR     10-2007-0000566 A     1/2007

OTHER PUBLICATIONS

Cordova, U.S. Office Action dated Dec. 30, 2020 directed to U.S. Appl. No. 16/218,274; 17 pages.

(Continued)

*Primary Examiner* — Waqaas Ali
(74) *Attorney, Agent, or Firm* — Morrison & Foerster LLP (57) ABSTRACT

A filtration apparatus for a container, the apparatus includes a connection portion for securing the apparatus to the container; a housing; a hand pump attached to the housing, the hand pump comprising an inlet, an outlet, and a user-operated actuator, the hand pump is configured to pass filtered water through the inlet in a first direction towards the outlet of the hand pump during a first stroke of the user-operated actuator, and in both the first direction and in a second direction opposite to the first direction during a second stroke of the user-operated actuator; and a filter fluidly connected to the inlet of the hand pump, the housing is configured to house the filter and at least part of the hand pump, the housing is configured to pass water, the filter is configured to be a two-way valve for regulating water flow between the housing and the hand pump.

14 Claims, 8 Drawing Sheets

(56) References Cited

U.S. PATENT DOCUMENTS

| | | |
|---|---|---|
| D385,946 S | 11/1997 | Harrison et al. |
| 5,685,980 A * | 11/1997 | Patapoff ............... B01D 61/10 |
| | | 210/257.2 |
| D404,113 S | 1/1999 | Denkewicz, Jr. et al. |
| 6,165,362 A | 12/2000 | Nohren, Jr. et al. |
| D448,448 S | 9/2001 | Hughes et al. |
| 6,395,170 B1 | 5/2002 | Hughes et al. |
| 6,569,329 B1 | 5/2003 | Nohren, Jr. |
| D536,205 S | 2/2007 | Jensen et al. |
| D551,318 S | 9/2007 | MacNeil et al. |
| D571,433 S | 6/2008 | Koteskey |
| D596,703 S | 7/2009 | McKinney |
| D621,660 S | 8/2010 | Smiedt et al. |
| D631,286 S | 1/2011 | Smiedt et al. |
| D643,090 S | 8/2011 | Cumberland et al. |
| RE42,669 E | 9/2011 | Henshaw |
| 8,852,439 B2 | 10/2014 | Frauchiger et al. |
| D753,790 S | 4/2016 | Torgerud |
| D753,791 S | 4/2016 | Rashid et al. |
| 9,469,550 B2 | 10/2016 | Closi, Jr. et al. |
| D773,014 S | 11/2016 | Pale |
| D776,239 S | 1/2017 | Westrick et al. |
| D815,247 S | 4/2018 | Homer |
| D815,714 S | 4/2018 | Bell et al. |
| 2002/0056675 A1 | 5/2002 | Hegde |
| 2002/0074365 A1 | 6/2002 | Young |
| 2005/0035041 A1 | 2/2005 | Nohren, Jr. et al. |
| 2009/0014366 A1 | 1/2009 | Takeda et al. |
| 2013/0199989 A1 | 8/2013 | Carter et al. |
| 2014/0083564 A1 | 3/2014 | Yan |
| 2014/0175098 A1 | 6/2014 | Lane |
| 2015/0374169 A1 | 12/2015 | Salas-de la Cruz et al. |
| 2016/0251234 A1 | 9/2016 | Hayslett et al. |
| 2020/0189932 A1 | 6/2020 | Cordova |

OTHER PUBLICATIONS

"LifeStraw Choose Your Product," located at https://web.archive.org/web/20180105052937/https//lifestraw.eartheasy.com/ visited on Jan. 5, 2018. (7 pages).

"LifeStraw Universal," located at https://web.archive.org/web/20170822114011/http://lifestraw.com/products/lifestraw-universal/ visited on Aug. 22, 2017. (3 pages).

"Polysulfone Hollow Fiber Membrane," located at http://www.filcore.co.kr/neweng/images/data/filcore_product_descriptions.pdf visited on Dec. 6, 2018. (33 pages).

"Water Purifier," located at http://www.filcore.co.kr/neweng/html/products/products01.html visited on Dec. 18, 2018. (3 pages).

Cordova et al., Office Action dated Jan. 13, 2020, directed to Design U.S. Appl. No. 29/673,209; 8 pages.

Cordova, U.S. Office Action dated Sep. 17, 2020 directed to U.S. Appl. No. 16/218,274; 9 pages.

Cordova. (2017). "Faircap: The Open Water Filter," located at https://web.archive.org/web/20171019082520/https://challenge.whatdesigncando.com/projects/faircap-the-open-water-filter/ visited on Dec. 29, 2019. (5 pages).

Cordova. (Apr. 13, 2015). "How It All Started," located at http://faircap.org/how-it-all-started-2/ visited on Dec. 29, 2019. (6 pages).

* cited by examiner

SELF-CLEANING WATER FILTER

FIELD OF THE DISCLOSURE

This disclosure relates generally to water filtration, and more specifically to low-cost self-cleaning water filters.

BACKGROUND OF THE DISCLOSURE

Access to clean water is an issue in areas that do not have the infrastructure in place to filter contaminated sources of water. Some areas may also lack the monetary funds to install the appropriate infrastructure to remove contaminants and distribute clean water. In such areas, contaminated water may contain harmful levels of microbiological and chemical contaminants, rendering the water unsafe to use for cleaning or drinking.

Household water filters may be purchased commercially for filtering water to remove contaminants. Proper maintenance of the filters may include replacing the filters after they become clogged with sediments particles, biological deposits, or a combination thereof. However, communities, families, or individuals that lack access to clean water may also lack the funds to initially buy an effective water filter and then continuously purchase replacement filters. Alternatively, filters may be cleaned to unclog the filter. However, typical cleaning process may be cumbersome in that they include disassembly of the filter. Also, typical cleaning processes may not be feasible for communities, families, or individuals that lack access to clean water as typical cleaning processes include rinsing the disassembled filter with a cleaning solution followed by a rinse with clean water.

Thus, communities, families, or individuals that live in or travel to areas with little to no access to clean water find difficulty in securing clean water for daily use.

SUMMARY OF THE DISCLOSURE

Access to clean water may be expanded by disseminating a low-cost, re-usable, self-cleaning filtration apparatus. The low-cost, re-usable, self-cleaning filtration apparatus described herein may be used for providing clean water to communities, families, or individuals that live in areas with little to no access to clean water. The filtration apparatus may include a filter and a hand pump fluidly connected to the filter for filtering water from a container via gravity or a combination of gravity and mechanical pumping.

According to some embodiments, the filtration apparatus may simultaneously exit filtered water from a container and clean the filter of filtration apparatus without disassembly of the filtration apparatus. According to some embodiments, the filtration apparatus may be self-cleaned without disassembly, risk of damaging the filtration apparatus during disassembly or cleaning, and without contaminating the filtration apparatus while attempting to clean the filtration apparatus.

According to some embodiments, the filtration apparatus may be mounted to a container (such as a bucket, jerrycan, water container) that is configured to hold water. The filtration apparatus may be mounted using a threaded mechanism that installs into any flat surface like a bucket lid or jerrycan cap. According to some embodiments, the filtration apparatus may be mounted using a threaded mechanism that installs into a curved surface such as a curved surface like a bucket wall. The filtration apparatus may be configured to filter water from the container. According to some embodiments, the filtration apparatus may configured to mount inside the container or may be installed external to the container.

The filtration apparatus may be configured to self-clean during use of the hand pump. In particular, the filtration apparatus may be configured to filter water from the container during a first stroke of the hand pump and both exit filtered water and clean the filtration apparatus during a second stroke of the hand pump. That is, the filtration apparatus may be configured to allow some of the filtrate located inside the filtration apparatus to exit the apparatus and some of the filtrate to return back into the filter to backwash it. The filtration apparatus may be configured to filter water via gravity regardless of whether mechanical pumping via the hand pump the hand pump is present. The filter outlet may have a 1 inch, 2 inch, or 3 inch thread for attaching a pipe extension or a tap to the filter, without the use of the pump.

According to some embodiments, the filtration apparatus may be used to filter contaminated water for providing clean water. Depending on type of filter media of the filtration apparatus, the filtration apparatus may be configured to filter debris and harmful chemicals, viruses, and bacteria from water. The flow rate of clean water out of the filtration apparatus may be sufficient to provide clean water for daily use. The flow rate of clean water in response to the first stroke of the hand pump may significantly higher than a flow rate of clean water out of the filtration apparatus via gravity alone.

According to some embodiments, in response to a first stroke of the hand pump (such as pulling a user-operated actuator of a piston of a hand pump away from the housing), a vacuum may be created and dirty water is sucked through the filter media, filtered water then flows into the pump and out of the pump's outlet. There may be filtered water that remains in the pump subsequent the first stroke. In response to a second stroke of the piston (such as pressing the user-operated actuator of the piston towards the housing), a portion of filtered water in the pump may be pushed back into the filter to backwash the filter. Since there is some space between the piston and the wall of the pump's chamber some water also gets squeezed out to the pump's outlet.

In some embodiments, a filtration apparatus for a container includes a connection portion for securing the filtration apparatus to the container; a housing; a hand pump attached to the housing, the hand pump comprising an inlet, an outlet, and a user-operated actuator, the hand pump is configured to pass filtered water through the inlet in a first direction towards the outlet of the hand pump during a first stroke of the user-operated actuator, and in both the first direction and in a second direction opposite to the first direction during a second stroke of the user-operated actuator; and a filter fluidly connected to the inlet of the hand pump, the housing is configured to house the filter and at least part of the hand pump, the housing is configured to pass water, the filter is configured to be a two-way valve for regulating water flow between the housing and the hand pump.

In any of these embodiments, the filter may be configured so that a first volumetric flow rate of filtered water passes from the filter to the inlet of the hand pump and a second volumetric flow rate of filtered water passes from the inlet of the hand pump back through the filter, the second volumetric flow rate having a smaller magnitude than the first volumetric flow rate.

In any of these embodiments, the second stroke may be configured to remove one or more of sediment particles and biological deposits from the filter.

In any of these embodiments, the first stroke may be in a direction away from the housing and the second stroke is in a direction towards the housing.

In any of these embodiments, the filter may be positioned about a circumference of a piston-cylinder assembly of the hand pump.

In any of these embodiments, the filter may be positioned in series with the pump.

In any of these embodiments, the housing may include pores configured to allow water to enter and exit the housing.

In any of these embodiments, the pores of the housing may have a size of 0.5-2 mm by 1-6 mm.

In any of these embodiments, the apparatus may be configured to filter water in a vertical position and in a horizontal position.

In any of these embodiments, the filter may include a filtration area of 0.2 $m^2$ to 2 $m^2$.

In any of these embodiments, the housing may have a length of 200 millimeters to 800 millimeters and fit within the container.

In any of these embodiments, if a valve positioned at the outlet is open, the hand pump may be configured to allow filtered water to exit through the outlet regardless of a position of the user-operated actuator.

In any of these embodiments, the filter may be configured to at least produce a turbidity reduction in a water sample from an initial turbidity of 40 Nephelometric Turbidity Unit (NTU) to a final turbidity of less than 1 NTU, under conditions described in the World Health Organization's (WHO) Standard International Scheme to Evaluate Household Water Treatment Technologies—Filtration Batch System Technology V 2.0 (Geneva, 2016), wherein the initial turbidity is obtained through an addition of fine test dust (ISO spec. 12103-A2) to reverse osmosis treated water.

In any of these embodiments, the filter may be configured to continuously flow at least 6,000 liters of filtered water having less than 1 NTU.

In any of these embodiments, the filter may be configured to achieve a percent reduction of bacteria of at least 99%, under conditions described in the World Health Organization's (WHO) Standard International Scheme to Evaluate Household Water Treatment Technologies—Filtration Batch System Technology V 2.0 (Geneva, 2016).

In some embodiments, a method for filtering water contained in a container includes securing a filtration apparatus to the container; filling the container with water to be filtered via a filtration apparatus secured to the container, the filtration apparatus comprising a housing, a filter housed within the housing, and a hand pump fluidly connected to the filter, the filter is configured to be a two-way valve for regulating water flow between the housing and the hand pump; flowing a filtrate out and away from the filter in response to one or more of a first stroke of the hand pump and gravity-driven filtration; and flowing a first portion of the filtrate away from the filter while flowing a second portion of the filtrate back towards the filter in response to a second stroke of the hand pump and gravity-driven filtration.

In any of these embodiments, a magnitude of flow of the second portion may be smaller than a flow of the first portion.

In any of these embodiments, the method may include removing one or more of sediment particles and biological deposits from the filter during the second stroke.

In any of these embodiments, the first stroke may be in a direction away from the housing and the second stroke may be in a direction towards the housing.

In any of these embodiments, the filter may be positioned about a circumference of a piston-cylinder assembly of the hand pump.

In any of these embodiments, the filter may be positioned in series with the hand pump.

In any of these embodiments, the housing may include pores configured to allow water to enter and exit the housing.

In any of these embodiments, the pores of the housing may have a size of 0.5-2 mm by 1-6 mm.

In any of these embodiments, the filtration apparatus may be secured to the container in a vertical position or in a horizontal position.

In any of these embodiments, the method may include flowing the filtrate or water to be filtered through a filtration area of 0.2 $m^2$ to 2 $m^2$ of the filter.

In any of these embodiments, the housing may have a length of 200 millimeters to 800 millimeters and fit within the container.

In any of these embodiments, if a valve positioned at the outlet is open, the method may include exiting filtered water from the filtration apparatus during the first stroke and during the second stroke.

In any of these embodiments, the filter may be configured to at least produce a turbidity reduction in a water sample from an initial turbidity of 40 Nephelometric Turbidity Unit (NTU) to a final turbidity of less than 1 NTU, under conditions described in the World Health Organization's (WHO) Standard International Scheme to Evaluate Household Water Treatment Technologies—Filtration Batch System Technology V 2.0 (Geneva, 2016), wherein the initial turbidity is obtained through an addition of fine test dust (ISO spec. 12103-A2) to reverse osmosis treated water.

In any of these embodiments, the filter may be configured to continuously flow at least 6,000 liters of reverse osmosis treated water having less than 1 NTU.

In any of these embodiments, the filter may be configured to achieve a percent reduction of bacteria of at least 99%, under conditions described in the World Health Organization's (WHO) Standard International Scheme to Evaluate Household Water Treatment Technologies—Filtration Batch System Technology V 2.0 (Geneva, 2016).

In addition, it is also to be understood that the singular forms "a", "an," and "the" used in the following description are intended to include the plural forms as well, unless the context clearly indicates otherwise. It is also to be understood that the term "and/or," as used herein, refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units, but do not preclude the presence or addition of one or more other features, integers, steps, operations, elements, components, units, and/or groups thereof.

In the following description of the disclosure and embodiments, reference is made to the accompanying drawings in which are shown, by way of illustration, specific embodiments that can be practiced. It is to be understood that other embodiments and examples can be practiced, and changes can be made, without departing from the scope of the disclosure.

BRIEF DESCRIPTION OF THE DRAWINGS

The disclosure will now be described, by way of example only, with reference to the accompanying drawings, in which.

DETAILED DESCRIPTION OF EXEMPLARY EMBODIMENTS

Described herein is an apparatus and method for filtering water via mechanical pumping, gravity, or a combination of thereof. The apparatus may include a filter and a hand pump fluidly connected to the filter. The filter and the hand pump may be at least partially housed within a housing of the apparatus. The apparatus may be attached to a container configured to hold water and the apparatus may contact water from the container. Water from the container may enter the apparatus through an opening of the housing and water may exit the apparatus through an outlet of the hand pump. The hand pump of the apparatus may include an actuator configured to move in a first direction for increasing a flow rate of clean water out of the apparatus and in a second direction for backwashing the filter while still flowing clean water out of the apparatus. The backwashing may remove sediments or biological deposits from the filter. According to some embodiments, the apparatus may be configured to allow water to flow out through the outlet of the hand pump regardless of the movement or a position of the actuator of the hand pump.

According to some embodiments, the apparatus may be configured to attach to the container for allowing at least a portion of the apparatus to be positioned within an interior of the container. The hand pump may include a threaded portion configured to screw the apparatus to the container. According to some embodiments, the apparatus may be configured to attach to the container for allowing the apparatus to be positioned external to the container. The apparatus may be attached to the container via a connector. The connector may include, for example, one or more of a hose, tube, adapter, and valve.

Figure 1:
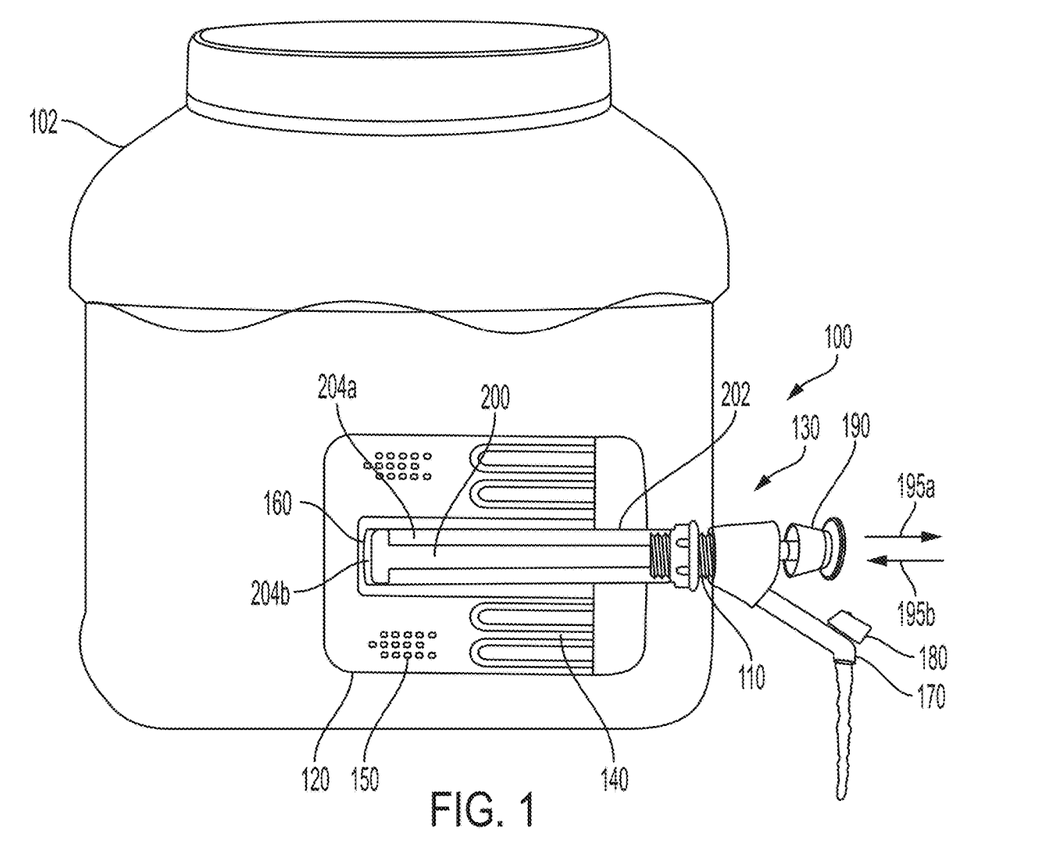
FIG. 1 shows an exemplary self-cleaning filtration apparatus, according to some embodiments.

FIG. 1 shows an exemplary self-cleaning filtration apparatus 100, according to some embodiments. The filtration apparatus 100 may be attached to an exemplary container 102 that may hold water. According to some embodiments, the filtration apparatus 100 may include a threaded portion 110 configured to screw the filtration apparatus 100 to the container 102. When the filtration apparatus 100 is screwed to the container, the filtration apparatus may be configured to filter water from the container. The filtration apparatus 100 may include a housing 120 configured to at least partially house a hand pump 130 of the filtration apparatus and a filter 140 of the filtration apparatus 100. The filter 140 may be fluidly connected to the hand pump 130.

According to some embodiments, the filtration apparatus 100 may be attachable or mountable to a wide variety of containers 102. For example, the filtration apparatus 100 may be attached to the container 102 by making a hole in a wall of the container. According to some embodiments, the filtration apparatus 100 may be installed in the wall of the container by screwing the filtration apparatus 100 through the hole in the wall of the container.

According to some embodiments, the filtration apparatus may be configured for moving water through the filtration apparatus based on gravity, actuation of a user-operated actuator of a hand pump, or a combination thereof. In the example of FIG. 1, the filtration apparatus 100 may be configured for moving water through the housing 120, through the filter 140, through the inlet 160 of the hand pump 130, and if a valve 180 is open, through the outlet 170 of the hand pump 130 based on a combination of gravity and actuation of a user-operated actuator 190 of the hand pump 130. The user-operated actuator 190 may be configured for mechanical pumping via movement of a piston 200 of a piston-cylinder assembly 202.

According to some embodiments, the housing 120 of the filtration apparatus 100 may be configured to fit inside the container 102. According to some embodiments, the housing 120 may have a length of at least about 200 millimeters, 300 millimeters, or 400 millimeters. According to some embodiments, the housing 120 may have a length of at most about 800 millimeters, 700 millimeters, or 600 millimeters. According to some embodiments, the housing 120 have a length of about 200-800 millimeters, 300-700 millimeters, or 400-600 millimeters.

According to some embodiments, the housing may include pores through which water may enter and exit the filtration apparatus. For example, the housing 120 may include a plurality of pores 150 for flowing water into the housing 120. The plurality of pores 150 may be configured to allow a user to poke filter media through the housing (for example, with their finger, nails or sharp objects) to agitate the filter media, for example, to help remove build up on the filter media. According to some embodiments, the plurality of holes 150 may be about 0.5 mm, 1 mm, 2 mm, or 5 mm by 1 mm, 2 mm, 4 mm, or 6 mm.

Figure 2:
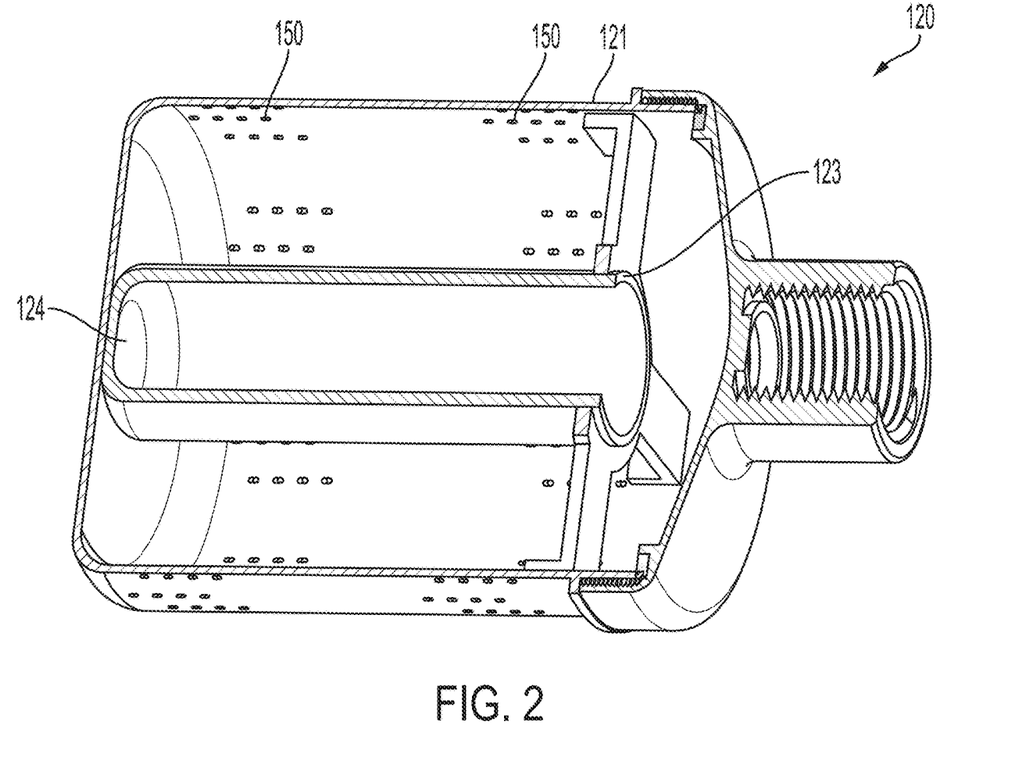
FIG. 2 shows an exemplary schematic of a housing, according to some embodiments.

FIG. 2 shows an exemplary schematic of the housing 120, according to some embodiments. The housing 120 may include an outer housing 121 for housing the filter 140 and an inner housing 123 for at least partially housing the hand pump 130. The inner housing 123 may include an aperture 124 for passing water between the filter 140 and hand pump 130.

According to some embodiments, the inner housing 123 may have a diameter of at least about 10 mm, 20 mm, or 30 mm. According to some embodiments, the inner housing 123 may have a diameter of at most about 70 mm, 40 mm, or 50 mm. According to some embodiments, the inner housing 123 may have a diameter of about 10-70 mm, 20-40 mm, or 30-50 mm.

According to some embodiments, the outer housing 121 may have a diameter of at least about 60 mm, 70 mm, or 80 mm. According to some embodiments, the outer housing 121 may have a diameter of at most about 110 mm, 100 mm, or 90 mm. According to some embodiments, the outer housing 121 may have a diameter of about 60-110 mm, 70-100 mm, or 80-90 mm.

The housing 120 may be configured to allow water to pass through the filter 140 for removing contaminants from the water. The filter 140 may include filter media. The filter media may include for example, ceramics, micrometer-sized membranes, or nanopositive cellulose materials. According to some embodiments, the filter media may remove 5 to 8 logs of bacteria and 1 to 4 logs of viruses.

According to some embodiments, the filter media may have a filtration area of at least about 0.05 $m^2$, 0.1 $m^2$, or 0.2 $m^2$. According to some embodiments, the filter media may have a filtration area of at most about 4 $m^2$, 3 $m^2$, or 2 $m^2$. According to some embodiments, the filter media may have a filtration area of about 0.05-4 $m^2$, 0.1-3 $m^2$, or 0.2-2 $m^2$. According to some embodiments, the filter media may comprise one or more of hydrophilic hollow fibers and hydrophobic hollow fibers. The combination of hydrophilic and hydrophobic hollow fibers provides at least two benefits. The hydrophilic hollow fibers attract water and encourage a maximum contact area between the hydrophilic hollow fibers and the water. On the other hand, the hydrophobic hollow fibers repel water and are configured to flow air into the filtration apparatus 100. Additionally, the flow of air through the hydrophobic hollow fibers promotes shorter filter drying times and reduces biological contamination to maintain a longer filter lifetime.

In some embodiments, the walls of the hollow fibers may include pores that may filter contaminants from water. The size of the pores may depend on the size of contaminants targeted for removal. For example, a pore size about 0.01 micron may be used for viruses and a pore size about 0.1 micron may be used for bacteria and sediment. In some embodiments, the nominal pore size may be less than about 0.01 micrometers, 0.02 micrometers, 0.03 micrometers, 0.04 micrometers, 0.05 micrometers, 0.06 micrometers, 0.07 micrometers, 0.08 micrometers, 0.09, 0.1 micrometers, or 0.2 micrometers. Contaminants larger than the pore size may not enter the hollow fibers through the pores. Thus, the contaminants larger than the pore size are filtered from the water. In some embodiments, contaminants including bacteria, cysts, protozoa, sediment, and/or debris may be filtered with pores having a size less than 0.1 micrometers, 0.3 micrometers, 0.5 micrometers, or 0.7 micrometers. In some embodiments, contaminants including viruses may be filtered with 0.01 micron-sized pores.

Figure 3:
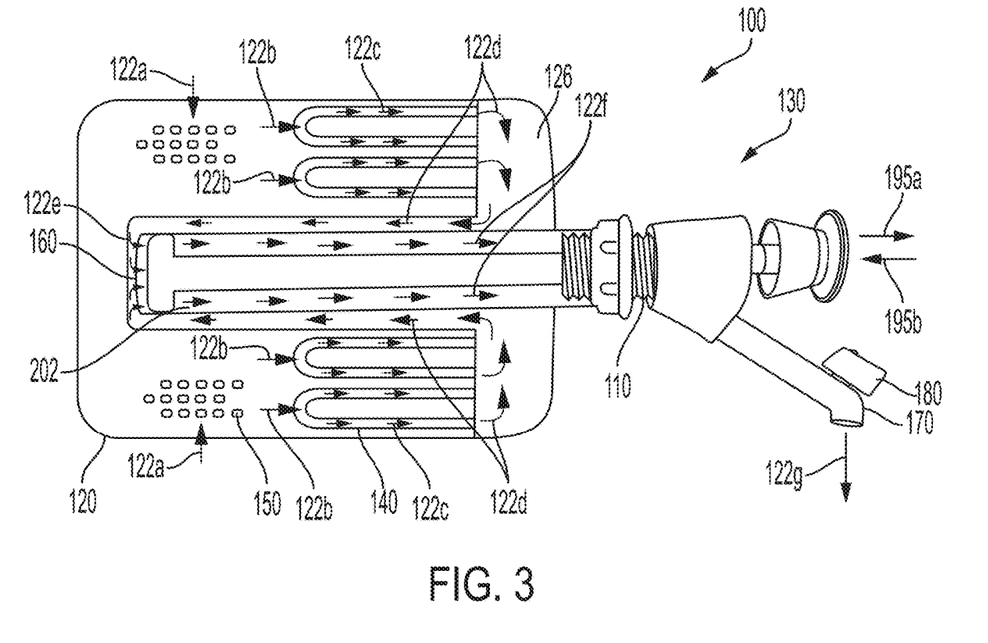
FIG. 3 shows an exemplary schematic of water flow through a filtration apparatus, according to some embodiments.

FIG. 3 shows an exemplary schematic of water flow (as indicated by a plurality of arrows) through the filtration apparatus 100, according to some embodiments. As shown in the example of FIG. 3, the filtration apparatus 100 may be configured for allowing water to pass from the pores of the housing (as indicated by arrows 122*a*), through the housing 120 to the filter 140 (as indicated by arrows 122*b*), through the filter 140 for removing contaminants from the water (as indicated by arrows 122*c*), out of the filter 140 towards the inlet 160 (as indicated by arrows 122*d*), through the inlet 160 of the hand pump 130 (as indicated by arrows 122*e*), towards the outlet 170 of the hand pump 130 (as indicated by arrows 122*f*) via gravity or a combination of gravity and mechanical pumping. According to some embodiments, water moving towards the outlet 170 may exit through the outlet 170 of the hand pump 130 via gravity or a combination of gravity and mechanical pumping if the valve 180 is open. According to some embodiments, the filtration apparatus 100 may be configured to pass water in flow directions as indicated by arrows 122*a-f* (and in flow directions opposite to directions of arrows 122*a-f*). As shown in the example of FIG. 3, the filtration apparatus 100 includes a curvilinear flow path between the filter 140 and the inlet 160 of the hand pump 130. The curvilinear water flow path of the filtration apparatus 100 allows the filtration apparatus to be compact. According to some embodiments, the curvilinear water flow path of the filtration apparatus 100 allows the filter media of the filtration apparatus 100 to be positioned before a vacuum chamber of the piston-cylinder assembly 202.

According to some embodiments, a flow rate of water through the filtration apparatus 100 based on gravity alone may be at least about 50 ml/min, 100 ml/min, or 200 ml/min. According to some embodiments, the flow rate of water through the filtration apparatus 100 based on gravity alone may be at most about 2,000 ml/min, 1,500 ml/min, or 1,000 ml/min. According to some embodiments, the flow rate of water through the filtration apparatus 100 based on gravity alone may be about 50-2,000 ml/min, 100-1,500 ml/min, or 200-1,000 ml/min. The flow rate of water through the filtration apparatus 100 may be dependent on pore size of the housing 120 and the filter 140. Larger particles such as debris may be retained on the housing wall. The pores of the filter media may be are sub-micron sized to filter pathogens from the water.

According to some embodiments, the hand pump 130 may be configured to increase the flow rate of water through the filtration apparatus 100 compared to the flow rate of water through the filtration apparatus 100 based on gravity alone. According to some embodiments, the flow rate of water through the filtration apparatus 100 based on mechanical pumping or a combination of mechanical pumping and gravity may be at least about 800 ml/min, 1,000 ml/min, or 1,500 ml/min. According to some embodiments, the flow rate of water through the filtration apparatus 100 based on mechanical pumping or a combination of mechanical pumping and gravity may be at most about 4,000 ml/min, 3,000 ml/min, or 2,000 ml/min. According to some embodiments, the flow rate of water through the filtration apparatus 100 based on mechanical pumping or a combination of mechanical pumping and gravity may be about 800-4,000 ml/min, 1,000-3,000 ml/min, or 1,500-2,000 ml/min.

The increase in the flow rate of water through the filtration apparatus 100 may be relatively larger for filters having smaller pore sizes compared to filters having larger pore sizes. For example, the flow rate of water through the filtration apparatus 100 may increase from an exemplary 200 ml/min to an exemplary 1,500 ml/min for a filter having a pore size of 0.01 micrometer, whereas the flow rate of water through the filtration apparatus 100 may increase from an exemplary 1,000 ml/min to an exemplary 2,000 ml/min for a filter having a pore size of 0.1 micrometer.

According to some embodiments, mechanical pumping may be enabled via one or more strokes of the piston 200. A first stroke of the user-operated actuator 190 may move the piston 200 in a first direction 195*a* and a second stroke may move the piston 200 in a second direction 195*b* opposite to the first direction 195*a*. According to some embodiments, the first stroke of the user-operated actuator 190 may be in a direction away from the housing towards the outlet 170 (as indicated by arrow 195*a*). According to some embodiments, the second stroke of the user-operated actuator 190 may be in a direction towards the housing away from the outlet 170 (as indicated by arrow 196*b*).

According to some embodiments, the filtration apparatus may include a headspace 126. The amount of force for actuating the hand pump 130 may be dependent at least on the headspace 126. For efficient filtration through the filtration apparatus, the headspace may not be too large otherwise there is initially a lot of air that must be pumped out of the apparatus before clean water starts flowing. If the headspace is too small then it would create a bottleneck effect. According to some embodiments, the headspace may be at least 3 mm, 4 mm, or 5 mm. According to some embodiments, the headspace may be at most 25 mm, 22 mm, or 20 mm. According to some embodiments, the headspace me be 3-25 mm, 4-22 mm or 5-20 mm.

According to some embodiments, the first stroke may be configured to fill a first portion 204a of the piston-cylinder assembly 202 and a second portion 204b with water. Volumetric capacities of the first portion 204a and the second portion 204b vary with movement of the piston 200. The first stroke may be configured to displace at least a portion of the water within the first portion 204a to the outlet 170 and, if the valve 180 is open, out through the outlet 170. The second stroke may be configured to displace at least a portion of water within the second portion 204b back through the inlet 160 of the hand pump, back through the filter 140, and back through pores 150 of the housing.

The first stroke may move water from the container (such as container 102), through the pores 150 of the housing 120, through the filter 140, through the inlet 160 of the hand pump 130, and if the valve 180 is open out through the outlet 170 of the hand pump 130. According to some embodiments, if the valve 180 that regulates the outlet 170 is open, water flowing through the filtration apparatus 100 towards the outlet 170 may exit through the outlet 170 regardless of a position or a movement of the user-operated actuator 190.

The second stroke of the hand pump 130 may be configured to backwash the filter 140 for removing one or more sediment particles and biological deposits from the filter 140. For example, the second stroke may move water in the second portion 204b of the piston-cylinder assembly 202 back through the inlet 160 of the hand pump 130 back through the filter 140, and out of the filtration apparatus 100 through the pores 150 of the housing 120. During the second stroke of the hand pump 130, water in the first portion 204a of the piston-cylinder assembly 202 may exit the outlet 170 of the pump if the valve 180 is open. Thus, according to some embodiments, the filtration apparatus 100 may be configured to allow water to exit through an open valve 180 during and between the first stroke and the second stroke of the hand pump 130, and exit through the pores 150 of the housing 120 during the second stroke of the hand pump 130.

According to some embodiments, the filtration apparatus 100 may include a self-cleaning mechanism enabled by a plurality of cycles of the hand pump 130. A cycle of the hand pump 130 may include the first stroke and the second stroke. The plurality of cycles of the hand pump 130 may be configured to wet the filter faster than by gravity alone. The plurality of cycles of the hand pump 130 may filter water for providing clean water and backwash the filter for removing build-up on the filter such as sediment particles, biological deposits, or a combination thereof. According to some embodiments, during the first strokes of the hand pump 130, the filtration apparatus 100 may be configured to filter water and pass the filtered water through the outlet 170 of the filtration apparatus 100. During the second strokes of the hand pump 130, the filtration apparatus 100 may be configured to filter water and pass the filtered water through the outlet 170 of the filtration apparatus 100, and backwash the filter with water that has already passed through the filter 140. According to some embodiments, the water used for backwashing the filter 140 may be exit the filtration apparatus through pores 150 of the housing 120. According to some embodiments, the water used for backwashing the filter 140 may be a portion of the water contained in the second portion 204b of the piston-cylinder assembly 202 as a result of one or more first strokes of the hand pump 130.

According to some embodiments, the filter 140 may be a two-way valve configured for passing water in a first direction for filtering water and for passing water in a second direction for backwashing the filter 140 with water that has already passed through the filter in the first direction. The filter may be configured to allow a higher volume (or higher magnitude of volumetric flow rate) of water to pass through in the first direction compared to the second direction. The lower volume or lower magnitude of volumetric flow of water in the second direction may be based on a resistance of the filter 140. The second stroke of the hand pump 130 may be configured to push water through the filter 140 against the resistance of the filter 140 for effectively opening up the clogged pores of the filter media. During the second stroke of the hand pump 130, gravitational pressure may allow the water to continue to flow through the filter 140 in the first direction.

According to some embodiments, bi-directionality of the filter 140 described above as a two-way valve and bi-directionality of the inlet 160 of the hand pump 130 allows the filtration apparatus 100 to filter water during the first stroke of the hand pump 130 and self-clean during the second stroke of the hand pump 130. According to some embodiments, the filtration apparatus 100 may be configured to simultaneously exit filtered water and backwash the filter 140. According to some embodiments, if the valve 180 is open, water in the first portion 204a of the piston-cylinder assembly 202 may exit the filtration apparatus 100 through the outlet 170 during the first stroke and the second stroke of the hand pump 130. According to some embodiments, the filter 140 may be a two-valve for the hand pump 130.

According to some embodiments, the filter 140 may allow at least about 50%, 60%, or 70% of a volume of water in contact with the filter 140 to pass through the filter 140 in the first direction. According to some embodiments, the filter 140 may allow at most about 80%, 90%, or 100% of a volume of water in contact with the filter 140 to pass through the filter 140 in the first direction. According to some embodiments, the filter 140 may allow about 50-80%, 60-90%, or 70-100% of a volume of water in contact with the filter 140 to pass through the filter 140 in the first direction.

According to some embodiments, the filter 140 may allow at least about 10%, 20%, or 30% of a volume of water in contact with the filter 140 to pass through the filter 140 in the second direction. According to some embodiments, the filter 140 may allow at most about 45%, 40%, or 35% of a volume of water in contact with the filter 140 to pass through the filter 140 in the second direction. According to some embodiments, the filter 140 may allow at most about 10-45%, 20-40%, or 30-35% of a volume of water in contact with the filter 140 to pass through the filter 140 in the second direction.

Figure 4:
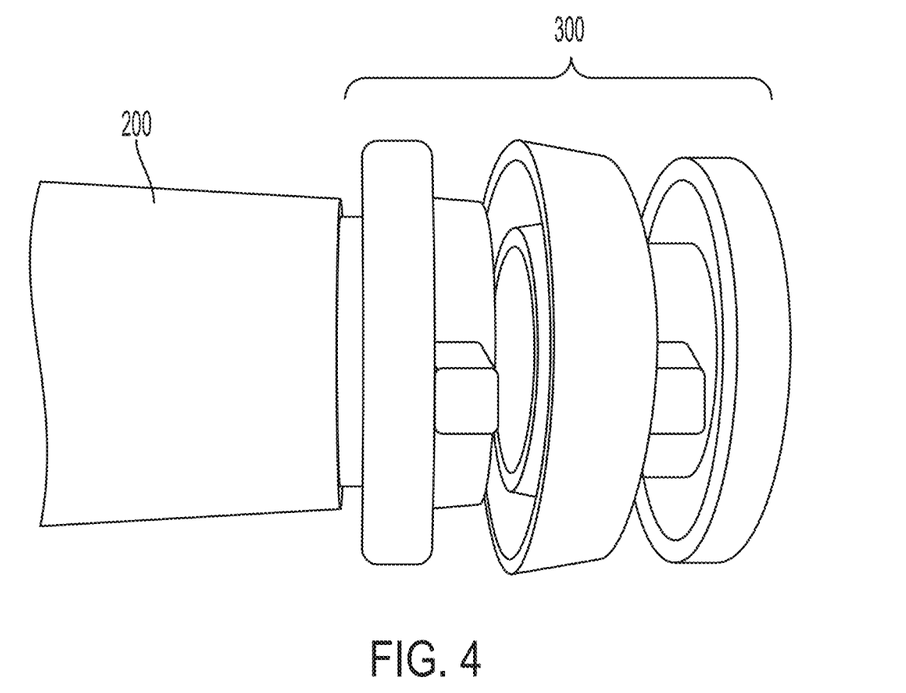
FIG. 4 shows an exemplary rubber valve of a hand pump, according to some embodiments.

According to some embodiments, the piston 200 may include a rubber valve for regulating flow between the first portion 204a of the piston-cylinder assembly 202 and the second portion 204b of the piston-cylinder assembly 202. FIG. 4 shows an exemplary rubber valve 300, according to some embodiments. According to some embodiments, the rubber valve 300 may be configured to allow water from the second portion 204b of the piston-cylinder assembly 202 to be sucked into the first portion 204a of the piston-cylinder assembly 202 during a first stroke of the hand pump 130 and prevent water from flowing from the first portion 204a to the second portion 204b of the piston-cylinder assembly 202 during the second stroke of the hand pump 130.

As shown in the examples of FIGS. 1 and 3, the filter 140 may be configured about a circumference of the piston-cylinder assembly 202. The configuration of the filter 140 about the piston-cylinder assembly 202 enables the filtration apparatus 100 to have a size suitable for fitting into a variety of containers (such as a bucket, a tank, a jerry can, a jug, a barrel, a bag). According to some embodiments, the filtration apparatus 100 may be compact and may be mounted inside a container or external to the container. According to some embodiments, the filter may be positioned in series with the piston-cylinder assembly 202.

Figure 5:
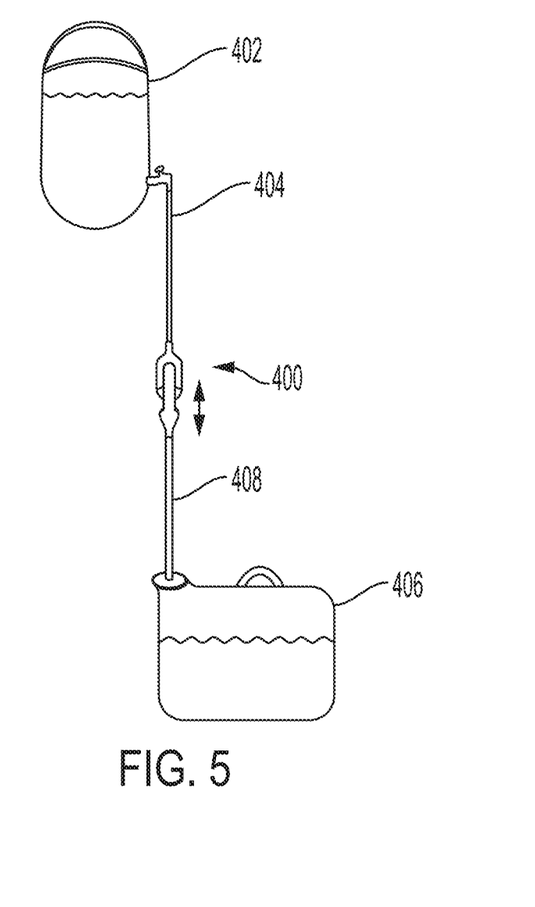
FIG. 5 shows an exemplary filtration apparatus connected to a first container and a storage container, according to some embodiments.

FIG. 5 shows an exemplary filtration apparatus 400, according to some embodiments. The filtration apparatus 400 may be mounted external to a container 402 configured for holding water. According to some embodiments, the filtration apparatus 400 may be an inline filter with water flow through the filtration apparatus 400. The filtration apparatus 400 may be configured to receive water from the first container 402 via a first connection portion 404. The filtration apparatus 400 may be configured to filter the received water and pass filtered water through the filtration apparatus 400 to a storage container 406 via a second connection portion 408. The filtration apparatus 400 may filter water and backwash a filter of the filtration apparatus 400 as described above in reference to the filtration apparatus 100. For brevity, such similar details for the filtration apparatus 400 will not be discussed as they have already been discussed in reference to filtration apparatus 100.

According to some embodiments, the filtration apparatus may hang from the first container 402 by the first connection portion 404. The first connection portion 404 may be, for example, tube, hose, or conduit. An inlet of the filtration apparatus 400 may be configured to attach to the first connection portion 404 and an outlet of the filtration apparatus 400 may be configured to direct filtered water to the storage container 406. The filtered water may be directed to the storage container 406 via the second connection portion 408 attached to the outlet of the filtration apparatus 400. The filtration apparatus 400 arranged as an inline filter as shown in the example of FIG. 5 may have the advantage of a height differential that creates more pressure for the water to flow through the filtration apparatus 400 and thus allows for a faster filtration rate based on the height differential. For example, a 1 meter height differential between the first container 402 and the filtration apparatus 400 may create 1 bar of pressure.

Figure 6:
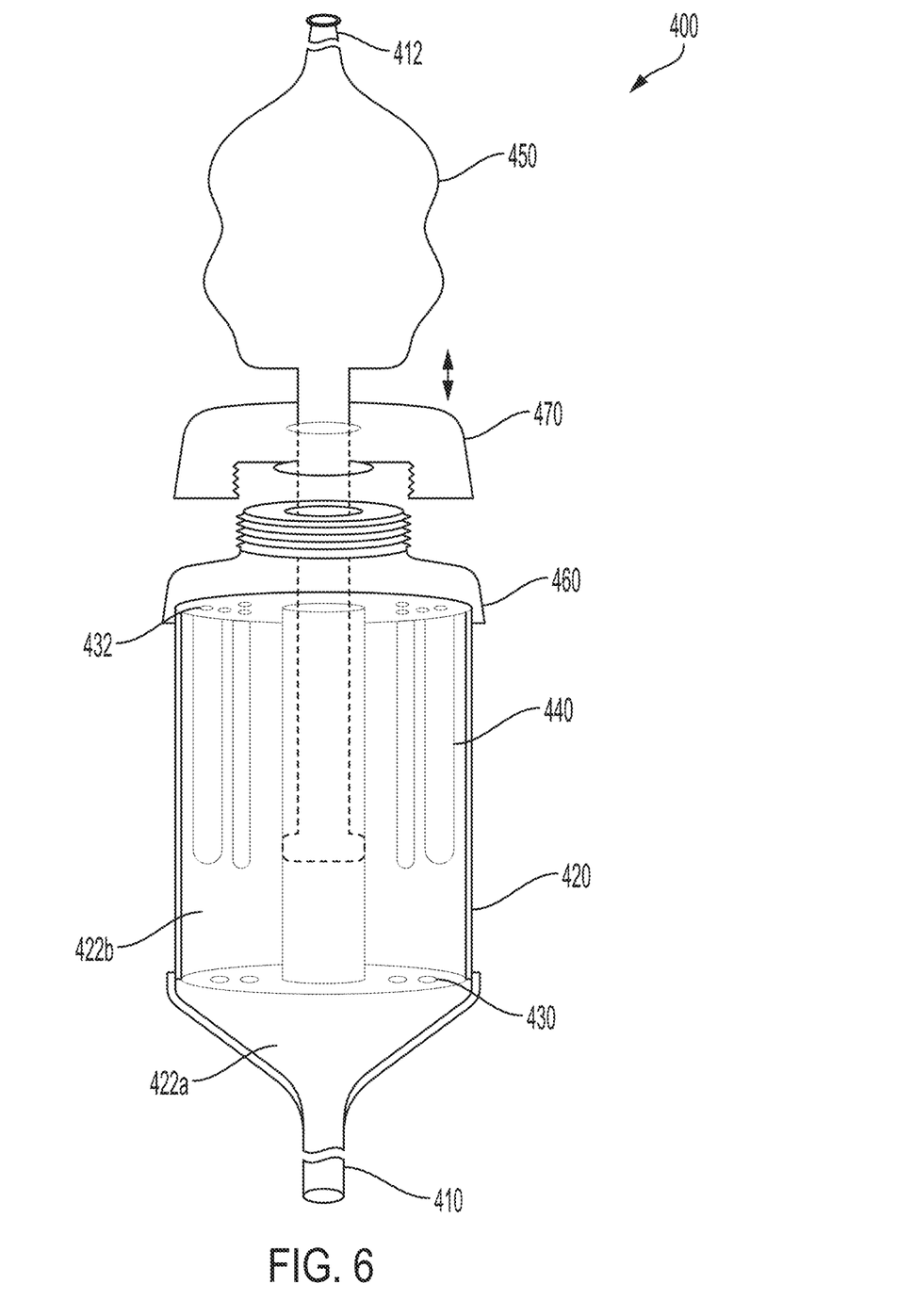
FIG. 6 shows a partially exploded, cross-sectional view of an exemplary filtration apparatus, according to some embodiments.

FIG. 6 shows the exemplary filtration apparatus 400, according to some embodiments. The filtration apparatus 400 may include a dirty water inlet 410 and a filtered water outlet 412. The filtration apparatus 400 may be configured to allow water to flow from the dirty water outlet 410 to the filtered water outlet 412. According to some embodiments, the filtration apparatus 400 may include a housing 420 that includes a first portion 422a, a second portion 422b, and a plurality of first pores 430 for passing water between the first portion 422a and the second portion 422b. The second portion 422b may be configured to house a filter 440 and at least partially house a hand pump 450. According to some embodiments, the filter 440 may be a two-way valve of the hand pump 412. The housing 420 may include a plurality of second pores 432 for passing water between the second portion 422b and the hand pump 450. According to some embodiments, the filtration apparatus 400 may include a first connection portion 460 for attaching the second portion 422b to the hand pump 450. According to some embodiments, the filtration apparatus 400 may include a second connection portion 470 for attaching the hand pump 450 to the second portion 422b. According to some embodiments, the first connection portion 460 may be configured to attach to the second connection portion 470 for sealing the hand pump 450 to the second portion 422b.

Figure 7A:
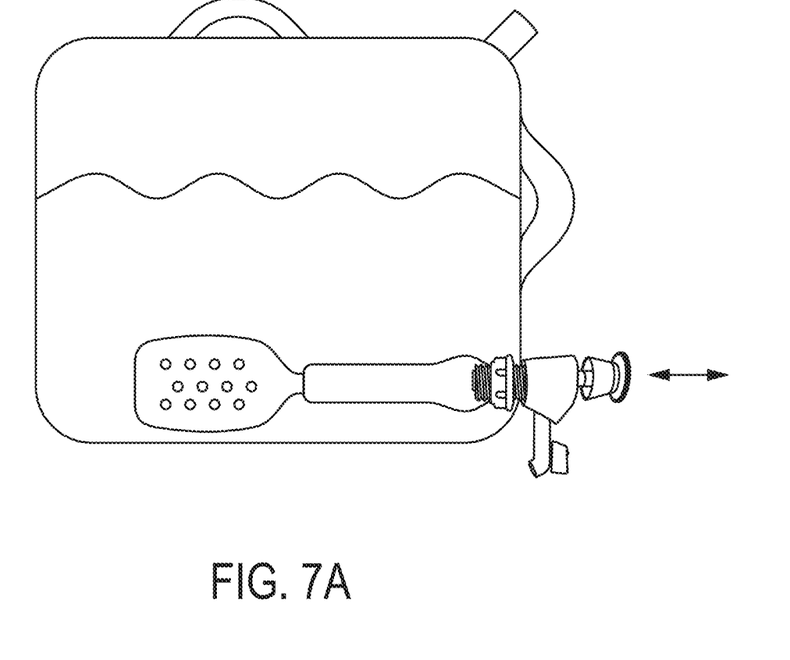
FIG. 7A shows an exemplary filtration apparatus configured in an exemplary horizontal configuration, according to some embodiments.
Figure 7B:
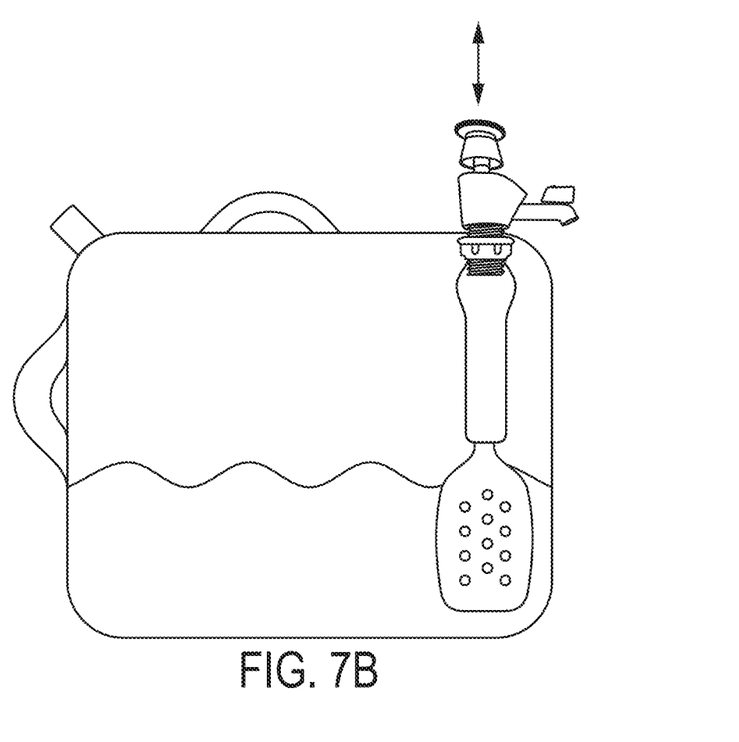
FIG. 7B shows an exemplary filtration apparatus configured in an exemplary vertical configuration, according to some embodiments.

According to some embodiments, the filtration apparatus may be configured in a horizontal configuration or in a vertical configuration. In either configuration, the filtration apparatus may be configured to mount to the container to form a single unit for providing filtered water while backwashing the filter. According to some embodiments, the vertical configuration may include filter media that include hydrophobic filaments. The hydrophobic filaments may be configured to pump air into filter due to, for example, low water level in the container.

According to some embodiments, the filter media may include at least about 2% hydrophobic filaments, 5% hydrophobic filaments, or 8% hydrophobic filaments. According to some embodiments, the filter media may include at most about 20% hydrophobic filaments, 15% hydrophobic filaments, or 12% hydrophobic filaments. According to some embodiments, the filter media may include about 2-20% hydrophobic filaments, 5-15% hydrophobic filaments, or 8-12% hydrophobic filaments. An exemplary horizontal configuration according to some embodiments is shown in FIG. 7A. An exemplary vertical configuration according to some embodiments is shown in FIG. 7B.

The pressure for passing water through the filtration apparatus 100, 400 may be less than about 1 bar, less than 2 bar, less than 3 bar, less than 4, or less than 5 bar. The corresponding flow rate may be less than about 1 Liter per minute, less than 2 Liters per minute, less than 3 Liters per minute, less than 4 Liters per minute, or less than 5 Liters per minute.

An operating pressure of the filter 140 may vary depending on a configuration of the filtration apparatus and choice of filter media. For example, filter media including pores of 0.1 micrometer and having a filtration area of about 0.5 m$^2$ may sustain pressure from about 0.1 bar to 3 bar. Gravity alone may create a pressure of 1 bar at 1 meter in height. Thus, in this example, through gravity alone, the filtration apparatus 100 may operate between 0.1 to 1 bar. In this example, and according to some embodiments, the hand pump 130 may increase the flow rate from 1 liter per minute (based on gravity) to about 2 Liters per minute.

The filter of the filtration apparatus 100, 400 meets the World Health Organization (WHO) *E. coli* and protozoa reduction requirements described in the 2016 WHO International Standard Scheme to Evaluate Household Water Treatment Technologies—Filtration Batch System Technology V 2.0, Geneva. This international scheme includes testing microbiologically spiked water samples, one with low turbidity (less than 1 Nephelometric Turbidity Unit (NTU)) and another with high turbidity (40 NTU). The low turbidity water may be reverse osmosis treated water and the high turbidity water may be obtained through the addition of fine test dust (ISO spec. 12103-A2) to reverse osmosis treated water, as described in the WHO's International Standard Scheme. During operation under the procedures set forth in the above-mentioned WHO International Scheme, the filter may reduce *E. coli* present in contaminated water by a suitable reduction. For example, the filter 10 may reduce *E. coli* by a percentage greater than 99.99%, greater than 99.999%, greater than 99.999%, or greater than 99.9999%. Also, the filter may be configured to at least reduce turbidity in a water sample from 40 NTU to less than 1 NTU.

The filtration apparatus 100, 400 may be used several times. The number of liters that may pass through the filter may depend on levels of turbidity and microbiological contamination. For example, the filter of the filtration apparatus 100, 400 may flow less than about 1,000 Liters, less than 2,000 Liters, less than 3,000 Liters, less than 4,000 Liters, less than 5,000 Liters, less than 6,000 Liters, less than 7,000 Liters, less than 8,000 Liters, less than 9,000 Liters, or less than 10,000 Liters of clean water having less than 1 NTU.

Figure 8:
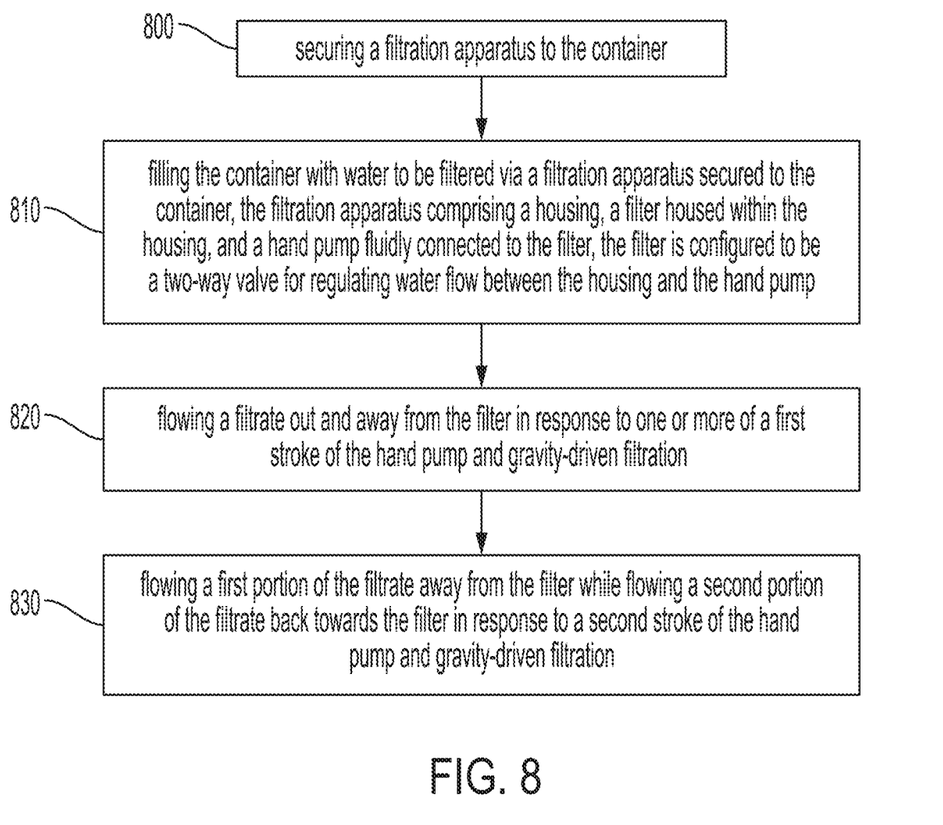
FIG. 8 shows an exemplary flow diagram of filtering water, according to some embodiments.

FIG. 8 shows a flowchart of an exemplary method for filtering water, according to some embodiments. At step 800, a filtration apparatus (such as 100, 400) may be secured to a container (such as 102, 402), according to some embodiments. The filtration apparatus may be a self-cleaning filtration apparatus. According to some embodiments, the filtration apparatus may be secured within an interior of the container or may be secured external to the container.

At step 810, the container may be filled with water to be filtered, according to some embodiments. The water may be filtered via the filtration apparatus secured (either internal or external) to the container. The filtration apparatus may produce a filtrate. According to some embodiments, the filtration apparatus may include a housing, a filter housed within the housing, and a hand pump fluidly connected to the filter. According to some embodiments, the filter may be configured to be a two-way valve for regulating water flow between the housing and the hand pump. According to some embodiments, the filter may be a two-way valve of the hand pump for regulating flow through an inlet of the hand pump.

At step 820, a filtrate may be flowed out and away from the filter, according to some embodiments. According to some embodiments, the filtrate may away from the filter in response to one or more of a first stroke of the hand pump and gravity-driven filtration. According to some embodiments, the filtrate may move away from the filter in response to gravity-driven filtration.

At step 830, a first portion of the filtrate may flow away from the filter, according to some embodiments. According to some embodiments, the first portion of the filtrate may flow away from the filter while flowing a second portion of the filtrate back towards the filter in response to a second stroke of the hand pump and gravity-driven filtration.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A filtration apparatus for a container, the apparatus comprising:
   a connection portion for securing the filtration apparatus to the container;
   a housing;
   a hand pump attached to the housing, wherein the hand pump comprising an inlet, an outlet, and a user-operated actuator, the hand pump is configured to pass filtered water through the inlet in a first direction towards the outlet of the hand pump during a first stroke of the user-operated actuator, and to pass filtered water simultaneously in the first direction and in a second direction opposite to the first direction and away from the outlet during a second stroke of the user-operated actuator; and
   a filter fluidly connected to the inlet of the hand pump, the housing is configured to house the filter and at least part of the hand pump, the housing is configured to pass water, the filter is configured to be a two-way valve for regulating water flow between the housing and the hand pump; and a valve positioned at the outlet of the hand pump, wherein if a the valve positioned at the outlet is open, the hand pump is configured to allow filtered water to exit through the outlet regardless of a position of the user-operated actuator.

2. The apparatus of claim 1, wherein the filter is configured so that a first volumetric flow rate of filtered water passes from the filter to the inlet of the hand pump and a second volumetric flow rate of filtered water passes from the inlet of the hand pump back through the filter, the second volumetric flow rate having a smaller magnitude than the first volumetric flow rate.

3. The apparatus of claim 1, wherein the second stroke is configured to remove one or more of sediment particles and biological deposits from the filter.

4. The apparatus of claim 1, wherein the first stroke is in a direction away from the housing and the second stroke is in a direction towards the housing.

5. The apparatus of claim 1, the filter is positioned about a circumference of a piston-cylinder assembly of the hand pump.

6. The apparatus of claim 1, wherein the filter is positioned in series with the pump.

7. The apparatus of claim 1, wherein the housing comprises pores configured to allow water to enter and exit the housing.

8. The apparatus of claim 7, wherein the pores of the housing have a size of 0.5-2 mm by 1-6 mm.

9. The apparatus of claim 1, wherein the apparatus is configured to filter water in a vertical position and in a horizontal position.

10. The apparatus of claim 1, wherein the filter comprises a filtration area of 0.2 $m^2$ to 2 $m^2$.

11. The apparatus of claim 1, wherein the housing has a length of 200 millimeters to 800 millimeters and fits within the container.

12. The apparatus of claim 1, wherein the filter is configured to at least produce a turbidity reduction in a water sample from an initial turbidity of 40 Nephelometric Turbidity Unit (NTU) to a final turbidity of less than 1 NTU, under conditions described in the World Health Organization's (WHO) Standard International Scheme to Evaluate Household Water Treatment Technologies—Filtration Batch System Technology V 2.0 (Geneva, 2016), wherein the initial turbidity is obtained through an addition of fine test dust (ISO spec. 12103-A2) to reverse osmosis treated water.

13. The apparatus of claim 1, wherein the filter is configured to continuously flow at least 6,000 liters of filtered water having less than 1 NTU.

14. The apparatus of claim 1, wherein the filter is configured to achieve a percent reduction of bacteria of at least 99%, under conditions described in the World Health Organization's (WHO) Standard International Scheme to Evaluate Household Water Treatment Technologies—Filtration Batch System Technology V 2.0 (Geneva, 2016).

* * * * *